UNITED STATES PATENT OFFICE.

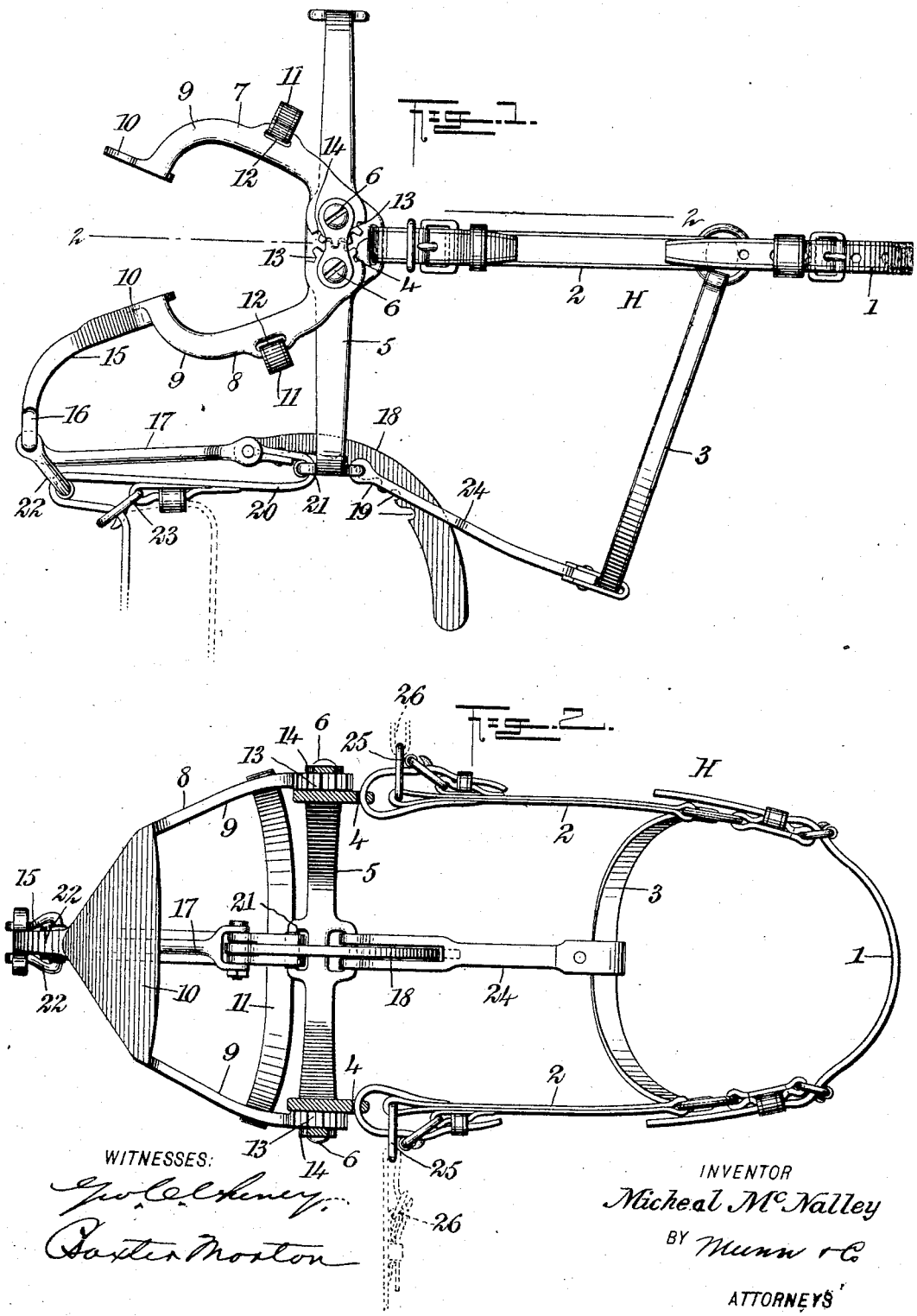

MICHEAL McNALLEY, OF ST. LOUIS, MISSOURI.

VETERINARY MOUTH-SPECULUM.

No. 796,852.      Specification of Letters Patent.      Patented Aug. 8, 1905.

Application filed August 3, 1904. Serial No. 219,315.

*To all whom it may concern:*

Be it known that I, MICHEAL McNALLEY, a citizen of the United States, and a resident of the city of St. Louis, State of Missouri, have invented a new and Improved Veterinary Mouth-Speculum, of which the following is a full, clear, and exact description.

This invention relates to a veterinary speculum, and more especially to a speculum designed for introduction into the mouth of a horse or other animal, such as an ox or mule; and it has for its principal object the provision of a speculum so constructed that the jaws of the animal may be forcibly separated and securely held in open position, so as to permit the introduction of instruments into the animal's mouth and the convenient and effective manipulation of the instruments therein.

A further object of the invention is to provide in a speculum of the type specified means for holding the speculum in adjusted position with such security that the accidental release of the parts of the speculum by any movement of the animal is completely obviated.

A further object of the invention is to provide a veterinary speculum with means whereby the head of the animal may be secured and held in a fixed position in his stall.

With the objects above stated and others of similar character in view, as will appear hereinafter, the invention consists in the novel construction, combination, and arrangement of parts of a veterinary speculum, as hereinafter described, and having the novel features thereof particularly pointed out in the appended claims, it being understood that the form and proportions of the parts described and their exact mode of assemblage may be varied within the scope of the appended claims without departing from the spirit of the invention.

Reference is to be had to the accompanying drawings, forming a part of this specification, in which similar characters of reference indicate corresponding parts in both views.

Figure 1 is a view in side elevation of a speculum constructed in accord with the present invention, the parts of the speculum being shown in the position taken when the animal's jaws are forced apart; and Fig. 2 is a sectional view upon the line 2 2 of Fig. 1.

Described in general terms, the speculum which forms the present invention consists of a suitable halter to support the mechanism of the speculum, a frame adapted to surround the lower part of the animal's head, a pair of oppositely-arranged jaw-engaging members pivotally mounted upon the frame and provided with means whereby movement may be imparted from one to the other, means connected with one of said jaw-engaging members for forcibly turning it upon its pivots, and means for securing the said jaw-engaging member in any desired adjustment.

Referring to the drawings by reference characters, H designates generally the halter, which supports the mechanism of the speculum and which consists of a head-strap 1, side straps 2 2, and a throat-latch 3, the several straps being suitably connected by rings and buckles in any ordinary or approved manner. The side straps 2 2 pass through eyes 4, formed in the sides of a frame 5, made preferably of steel and of sufficient size to encircle the lower portion of a horse's head and leave a considerable amount of space between the horse's head and the frame upon all sides. The frame 5 is of elongated form, as shown in the drawings, and is preferably formed in a single piece. At the sides the material of the frame is widened just below the eyes 4 4, through which the side straps 2 2 of the halter pass, and the widened portions of the frame afford support for two pairs of pivot pins or screws 6, upon which the jaw-engaging members 7 and 8 are mounted. Each of the jaw-engaging members is approximately of U shape, as best seen in Fig. 2, and comprises a pair of side arms 9 and a plate 10 of substantially triangular contour connecting the arms. Each of the jaw-engaging members 7 and 8 is likewise provided with a strap 11, passing through eyes 12, formed in the arms 9 of the member, and adapted to engage across the horse's nose or behind his lower jaw, as the case may be. The arms 9 of the jaw-engaging members 7 and 8 are provided at the ends which turn upon the pivot-pins 6 with intermeshing segmental gears 13, formed integral with the arms and adapted to transmit movement from one of said jaw-engaging members to the other. To hold the segmental gears 13 in proper relation, a plate 14 is preferably mounted upon each pair of pivot-pins 6 externally of the ends of the arms 9 of the jaw-engaging members 7 and 8, mounted upon the pivots.

In order to apply power to the jaw-engaging member 8 when it is desired to force the jaw-engaging members apart, a lever-arm 15 is rigidly attached to or formed integral with the plate 10 between the arms of the jaw-engaging member 8 and extended rearwardly and downwardly therefrom. The lever-arm 15 terminates in an eye 16, from which a link 17 extends upward. The link 17 is pivotally connected at its upper end with a curved rack-bar 18, provided with a plurality of notches upon its rear surface, the notches 19 being adapted to engage with the rear portion of the frame 5, upon which the jaw-engaging members are pivotally mounted. A strap 20 is also connected with the link 17 at its upper end and is passed through an eye 21 at the rear of the frame 5 and is then carried downward through a loop 22, pivoted in the eye 16 of the lever-arm 15, from which the strap 20 extends upwardly and rearwardly. A buckle 23 is provided on the strap 20 between the eye 21 and the loop 22, so that the strap may be secured after having been drawn downward through the loop 22 to any desired extent.

As will be readily seen from an inspection of the drawings and from the foregoing description, the strap 20 is the means employed for applying power to the lever-arm 15 when it is desired to separate the jaw-engaging members, and in order to hold the frame 5 in proper position when power is applied to the strap 20 a link 24 is provided between the rear portion of the frame 5 and the throat-latch 3. This link 24 is slotted in its lower end for the passage of the curved rack-bar 18, and it is pivotally connected with the frame, so as to readily adjust itself to any slight change of position of the frame.

In the use of the speculum as described in the foregoing paragraphs the jaw-engaging members are first brought together and then introduced into the animal's mouth in much the same way that a bit is introduced. The halter is then secured in position upon the animal's head, and the straps of the halter are so adjusted as to bring the plates 10 of the two jaw-engaging members into proper position relative to the animal's jaws. When the halter has been properly adjusted, the jaw-engaging members are separated to the desired extent by drawing downward and rearward upon the strap 20, which exerts an upward pull upon the link 17, and consequently draws the lever-arm 15 of the rear jaw-engaging member backward. Owing to the engagement of the segmental gears 13, carried by the two jaw-engaging members, the rearward movement of the jaw-engaging member 8 causes an equal simultaneous forward movement of the member 7. The two members are therefore separated, as shown in Fig. 1, and each member moves to substantially the same distance from its normal position relative to the frame 5. As the straps 11, carried by the jaw-engaging members, engage with the animal's nose and lower jaw, respectively, the jaws of the animal are held against any play upon the jaw-engaging members, and the movement of the lower portion of the animal's head relatively to the frame 5 is greatly restricted. This holding of the animal's head in a substantially fixed position relatively to the frame 5 is of importance in preventing the accidental disengagement of the rack-bar 18 from the frame. When the jaw-engaging members 7 and 8 are separated by the pull upon the strap 20, the rack-bar 18 is raised, and owing to the weight of the upwardly and rearwardly curved portion thereof the bar is caused to engage automatically with the frame 5, and so to lock the jaw-engaging member 8 against return to its normal position. This locking action of the rack-bar 18 is supplemented by the buckling of the strap 20, as already mentioned, so that in case of the accidental disengagement of the rack-bar from the frame the animal will not be enabled to close his jaws unless the strap 20 should be broken at the same time. In order, however, to prevent the disengagement of the rack-bar 18 from the frame 5, the straps 11 are provided to hold the animal's jaws against movement within the frame 5, and the animal is prevented from bringing his head into contact with the rack-bar 18, and thereby disengaging the bar and frame.

From the description of the apparatus it will be readily seen that means is provided for spreading the jaws of the animal apart to any necessary or desired extent, and means is also provided for holding the jaws in open position. It is also desirable in apparatus of the kind to which this invention relates to provide means for holding the head of the animal stationary, so that the manipulation of the instrument within his mouth may not be interfered with by movements of the head. To this end rings 25 are provided near the lower ends of the side straps 2 of the halter, and straps 26 may be brought into engagement with said rings and connected with the sides of the animal's stall or with other suitable fixed points.

A special feature of advantage of the apparatus which forms the present invention is the relatively large size of the frame 5 as compared with the animal's head and the provision of space between the animal's head and the frame at all points. This is desirable, because it prevents the animal from injuring himself and because it also obviates the possibility of contact of the animal's head with the rack-bar 18 and the other devices by means of which the apparatus is operated or held in adjusted position.

Having thus described my invention, I claim as new and desire to secure by Letters Patent—

1. The combination in a veterinary speculum, of a pair of movable jaw-engaging members, fixed coöperating devices upon said jaw-engaging members, whereby the movement of one of said jaw-engaging members imparts positive movement to the other, and means for drawing one of said jaw-engaging members in a rearward direction to open the jaws.

2. The combination in a veterinary speculum, of a pair of pivoted jaw-engaging members having intermeshing segmental gears whereby movement is imparted from one of said jaw-engaging members to the other.

3. The combination in a veterinary speculum, of a frame adapted to encircle an animal's head, a pair of movable jaw-engaging members carried by said frame, and coöperating devices integral with said jaw-engaging members whereby the movement of one of said members produces an opposite movement of the other member.

4. The combination in a veterinary speculum, of a supporting-frame, a pair of movable jaw-engaging members carried by said frame, means for imparting movement from one of said members to the other, and means arranged between one of said jaw-engaging members and the frame for forcibly drawing said member toward the frame.

5. The combination in a veterinary speculum, of a frame adapted to encircle an animal's head, jaw-engaging members carried by said frame, means for imparting movement from one of said members to the other, a lever-arm connected with one of said members, and a rack-bar connected with said lever-arm and engaging with said frame to hold the said jaw-engaging member in adjusted position.

6. The combination in a veterinary speculum, of a supporting-frame, a jaw-engaging member carried by said frame, a strap connected with said jaw-engaging member and slidable over a portion of said frame, whereby said jaw-engaging member may be drawn toward the frame.

7. The combination in a veterinary speculum, of a frame adapted to encircle an animal's head, a pair of jaw-engaging members pivotally mounted on said frame, and having intermeshing gears whereby movement is imparted from one of said jaw-engaging members to the other and a strap carried by each of said jaw-engaging members to hold one of the animal's jaws in proper position relatively to the jaw-engaging member.

8. The combination in a veterinary speculum, of a supporting-frame, a pair of jaw-engaging members movably mounted on said frame and having coöperating devices whereby the movement of one of said jaws produces an opposite movement of the other, means for drawing one of said jaw-engaging members toward the frame, and a rack-bar connected with said jaw-engaging member and adapted to engage automatically with the frame, to hold the jaw-engaging member in adjusted position.

9. The combination in a veterinary speculum, of a frame adapted to surround the lower part of an animal's head, a halter connected with the frame for supporting the same in position, means connected with the halter for securing the animal's head in a fixed position, a pair of movable jaw-engaging members carried by the frame, means for imparting movement from one of said members to the other, and means arranged between one of said jaw-engaging members and the frame for forcibly drawing said member toward the frame.

10. The combination in a veterinary speculum, of a frame, a pair of movable jaw-engaging members carried by said frame and each comprising side arms, and a plate connecting the arms, means for imparting movement from one of said jaw-engaging members to the other, a lever-arm connected with the plate of one of said jaw-engaging members, between the arms of said member, a link connected with said lever-arm, a curved rack-bar connected with said link and adapted to engage the frame to hold the said jaw-engaging member in adjusted position, and means connected with the lever-arm for drawing the said jaw-engaging member toward the frame.

In testimony whereof I have signed my name to this specification in the presence of two subscribing witnesses.

MICHEAL McNALLEY.

Witnesses:
W. S. GIST,
THEO. F. MEYER.